(12) United States Patent
Hirasawa et al.

(10) Patent No.: US 8,425,262 B1
(45) Date of Patent: Apr. 23, 2013

(54) ATTACHMENT STRUCTURE FOR ATTACHMENT OF COMPONENT TO ARTICLE AND ELECTRIC JUNCTION BOX HAVING THEREOF

(75) Inventors: Hitoshi Hirasawa, Makinohara (JP); Hiroaki Takahashi, Makinohara (JP); Makoto Nakayama, Kakegawa (JP); Takahiko Mitsui, Kakegawa (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 13/358,888

(22) Filed: Jan. 26, 2012

(51) Int. Cl.
*H01R 13/502* (2006.01)
(52) U.S. Cl.
USPC .......................................................... 439/701
(58) Field of Classification Search .................. 439/701, 439/76.2
See application file for complete search history.

(56) References Cited

U.S. PATENT DOCUMENTS

| | | | |
|---|---|---|---|
| 6,196,882 B1 | 3/2001 | Sato et al. | |
| 7,530,856 B2 * | 5/2009 | Yoshida et al. | 439/701 |
| 8,206,185 B2 * | 6/2012 | Jehmlich et al. | 439/701 |

FOREIGN PATENT DOCUMENTS

JP          11-234851 A       8/1999

* cited by examiner

*Primary Examiner* — Phuong Dinh
(74) *Attorney, Agent, or Firm* — Edwards Wildman Palmer LLP

(57) ABSTRACT

The attachment structure for attachment of a component to an article in two postures includes a case as the article and the component. The case includes a pair of guide portions, first locking arms and a second locking arm. The component includes a slide portion between the guide portions, a stopper arranged in an end of the slide portion and formed in a size which is not able to insert stopper between the guide portions. The first locking arm is engaged where the slide portion is inserted in a space between the guide portions from one end and slides toward an other end. The second locking arm is engaged where the slide portion is inserted in the space between the guide portions from the other end in a posture opposite to that in which the slide portion is inserted between the pair of the guide portions from the one end.

6 Claims, 19 Drawing Sheets

ATTACHMENT STRUCTURE FOR ATTACHMENT OF COMPONENT TO ARTICLE AND ELECTRIC JUNCTION BOX HAVING THEREOF

This application claims priority benefit of Japan Patent Application No. 2011-219868 and the full content of that application is incorporated by reference.

BACKGROUND OF THE INVENTION

1. Field of the Invention

The present invention relates to attachment structure for attachment of a component to an article and an electric junction box having the attachment structure.

2. Description of the Related Art

Various electric devices are mounted on a vehicle. In the vehicle, an electric junction box is arranged in a suitable place between an electric wire and the electronic device so as to supply electric power with the various electronic devices. Various electric junction boxes are used depending on the type of vehicle. For example, as an electric junction box disclosed in the Patent Document 1, a plurality of an attachment portions which is able to attach various components are provided.

The electric junction box disclosed in Patent Document 1 can improve arrangement of components, and can correspond to various electric components varying with the type of vehicle or grade.

The electric junction box disclosed in Patent Document 1 is able to attach various components to the attachment portion positioned at a desired place of a case as required. However, the electric junction box can only attach those components in a predetermined direction, namely, one position. That is, those components can not be attached to another position. Also, in a vehicle attaching the electric junction box, space can be efficiently used by attaching the components to the attachment portion of the case at an opposite position. Additionally, development of the attachment structure which can attach the components to the case at the opposite position is requested. Further, this problem occurs similarly in the attachment structure of the article other than the case and the components.

[Patent Document 1] JP, A, H11-234851

SUMMARY OF THE INVENTION

Objects to be Solved

Accordingly, an object of the present invention is to provide attachment structure which can attach an article to a component in both one direction and a direction opposite to the one direction, and an electric junction box having the attachment structure.

In order to achieve the above-mentioned objects, an attachment structure for attachment of a component to an article of the present invention includes (a) a pair of guide portions provided on the article, the guide portions extending parallel from one end of the article toward an other end thereof; (b) a slide portion provided in the component and adapted to be slidably positioned between the guide portions; (c) a first locking arm provided in the article and configured to be brought into locking engagement with the component in a state where the slide portion is inserted in a space between the pair of the guide portions from the one end of the article and slides toward the other end of the article, and thereby prevent the component from moving toward the one end of the article; (d) a second locking arm provided in the article and configured to be brought into locking engagement with the component in a state where the slide portion is inserted in the space between the pair of the guide portions from the other end of the article in a posture opposite to that in which the slide portion is inserted between the pair of the guide portions from the one end of the article, and thereby prevent the component from moving toward the other end of the article; and (e) a stopper provided at an end of the slide portion and sized and dimensioned to not enter the space between the pair of the guide portions, the stopper being configured to abut on an end surface of the pair of the guide portions at the one end of the article in a state where the first locking arm is in locking engagement with the component, and thereby prevent the component from moving toward the other end of the article, the stopper also being configured to abut on an end surface of the pair of the guide portions at the other end of the article, in a state where the second locking arm is in locking engagement with the component, and thereby prevent the component from moving toward the one end of the article.

In a second aspect of the attachment structure of the present invention, the first locking arm and the second locking arm are arranged in a wall positioned between the pair of the guide portions located in a direction opposite to each other. A projection projecting toward the wall is arranged in the slide portion. The first locking arm includes a first arm portion extending from the wall toward the other end of the article and formed in a cantilever-plate shape, and a first locking portion projecting from a free end of the first arm portion and overlapped on the projection, and the second locking arm includes a second arm portion extending from the wall toward the one end of the article and formed in a cantilever-plate shape, and a second locking portion projecting from a free end of the second arm portion and overlapped on the projection.

In a third aspect of the attachment structure of the present invention, the second locking arm includes a second arm portion extending from a wall positioned between the pair of the guide portions toward the one end of the article and formed in a cantilever-plate shape, a second locking portion projecting from a free end of the second arm portion, and a protrusion projecting from a free end of the second locking arm beyond the second locking portion in the same direction as the second locking portion. A width of a free end of the second arm portion beyond the second locking portion is thinner than a width of a fixed end of the second arm portion. The protrusion projects from a free end of the second locking arm beyond the second locking portion in the same direction as the second locking portion. when the slide portion is inserted between the pair of the guide portions from the other end of the article, the second locking portion is overlapped on the projection, and the component is engaged with the second locking arm. Also, when the slide portion is inserted between the pair of the guide portions from the one end of the article, the taper of the projection comes in contact with the protrusion, and the second locking arm is displaced toward the wall.

In a fourth aspect of the attachment structure of the present invention, an electric junction box includes the attachment structure for attachment of the component to the article described above.

Effect of the Invention

According to the first aspect of the present invention, the component can be attached to the article in both one direction and a direction opposite to the one direction. More specifically, the component can be attached to the article in the state where the slide portion is inserted in a space between the pair of the guide portions from the one end of the article and slides toward the other end of the article. Also, the component can be attached to the article in the state where the slide portion is inserted in the space between the pair of the guide portions from the other end of the article in a posture opposite to that in which the slide portion is inserted between the pair of the guide portions from the one end of the article.

According to the second aspect of the present invention, the attachment structure having simple and versatile construction can be provided.

According to the third aspect of the present invention, when the slide portion is inserted between the pair of the guide portions from the one end of the article, the projection can be prevented from being caught on the second locking portion. Furthermore, the slide portion can be smoothly inserted into the guide portions.

According to the fourth aspect of the present invention, the electric junction box which is able to improve space efficiency and to design an optimum layout in a vehicle can be provided The above and other objects and features of this invention will become more apparent from the following description taken in conjunction with the accompanying drawings.

DESCRIPTION OF THE PREFERRED EMBODIMENT

First Embodiment

"An attachment structure 1 of an article and a component" according to a first embodiment of the present invention will be explained with reference to FIGS. 1 to 8. "The attachment structure 1 of the article and the component" constructs "an electric junction box" mounted on a vehicle. The electric junction box supplies electric power with electronic devices mounted on the vehicle, and transfers a signal thereto. Incidentally, the electric junction box is referred to as a junction block, a junction box, a fuse block, a fuse box, a relay block, or a relay box. In this description, these junction blocks, the junction box, the fuse block, the fuse box, the relay block and the relay box are collectively called the electric junction box hereafter.

Figure 1:
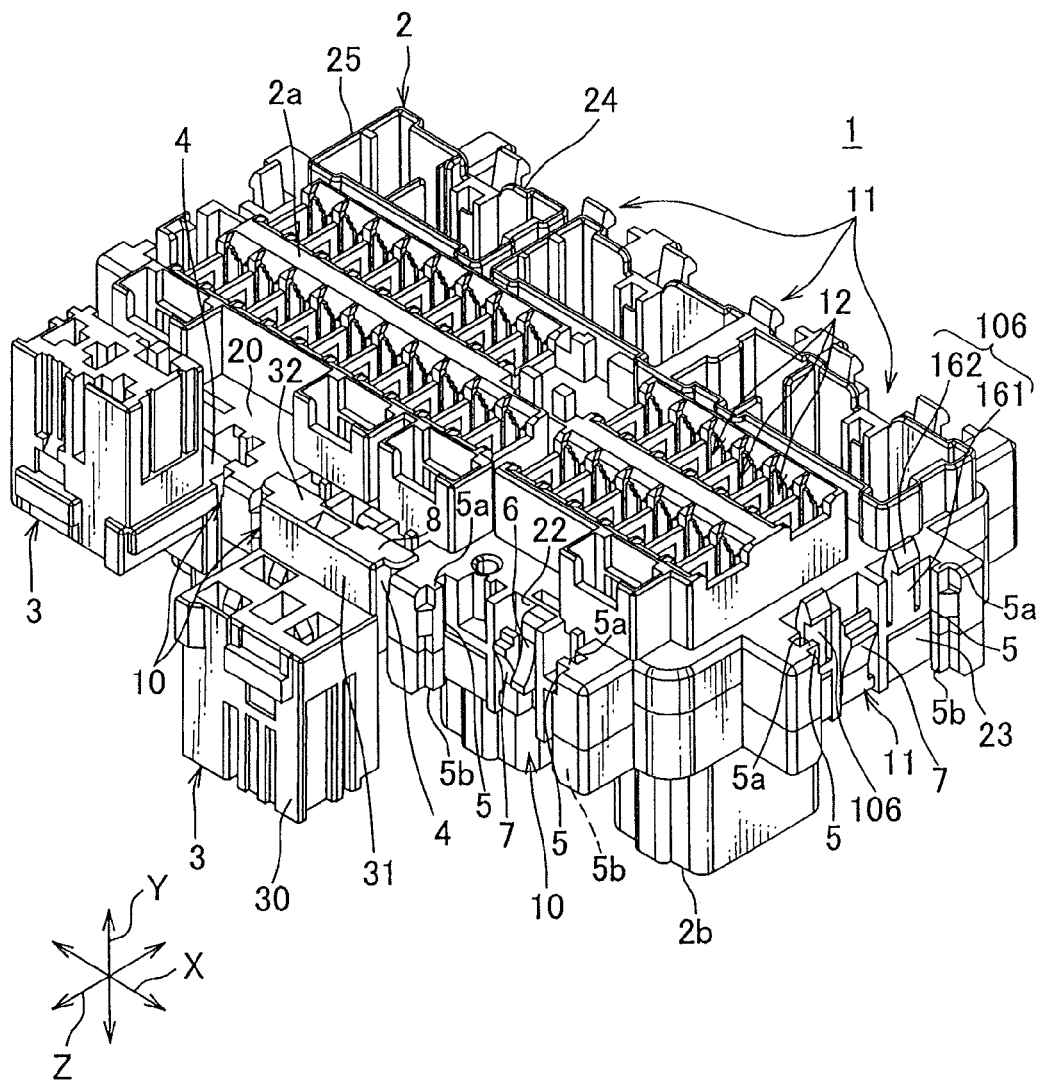
FIG. 1 is a perspective view showing an attachment structure of an article and a component according to a first embodiment of the present invention.
Figure 2:
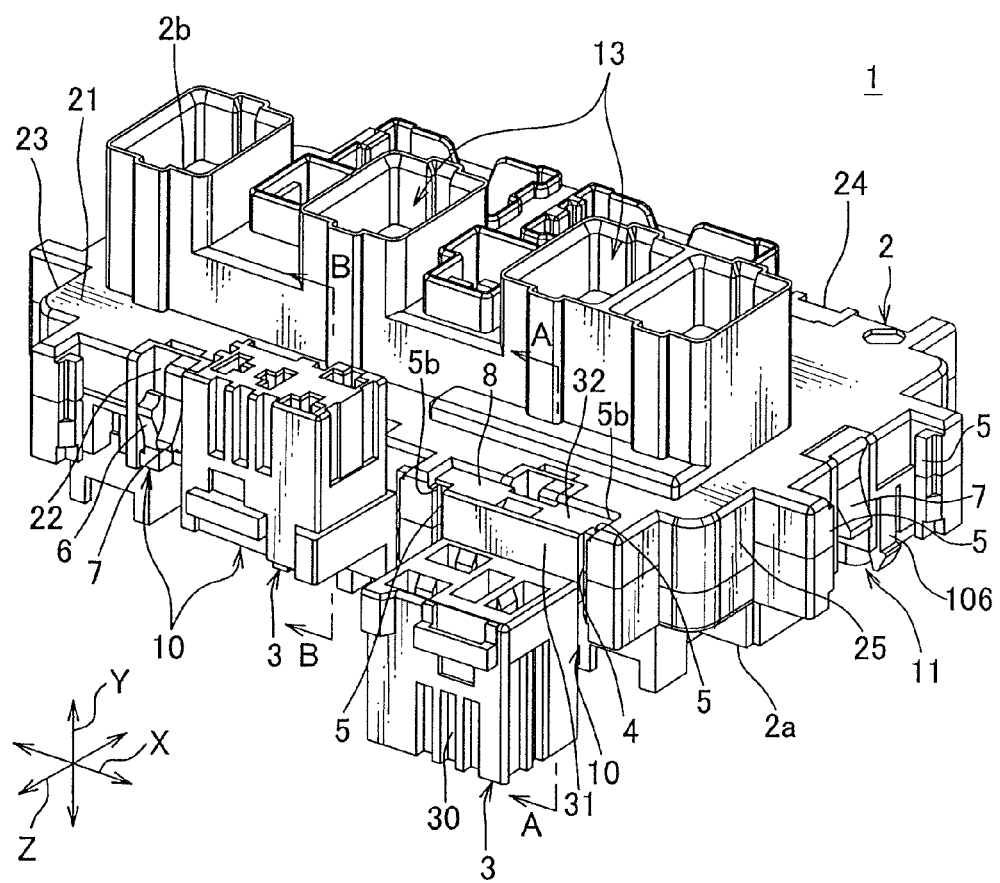
FIG. 2 is a perspective view showing the attachment structure of the article and the component shown in FIG. 1 from an upside down direction.
Figure 3:
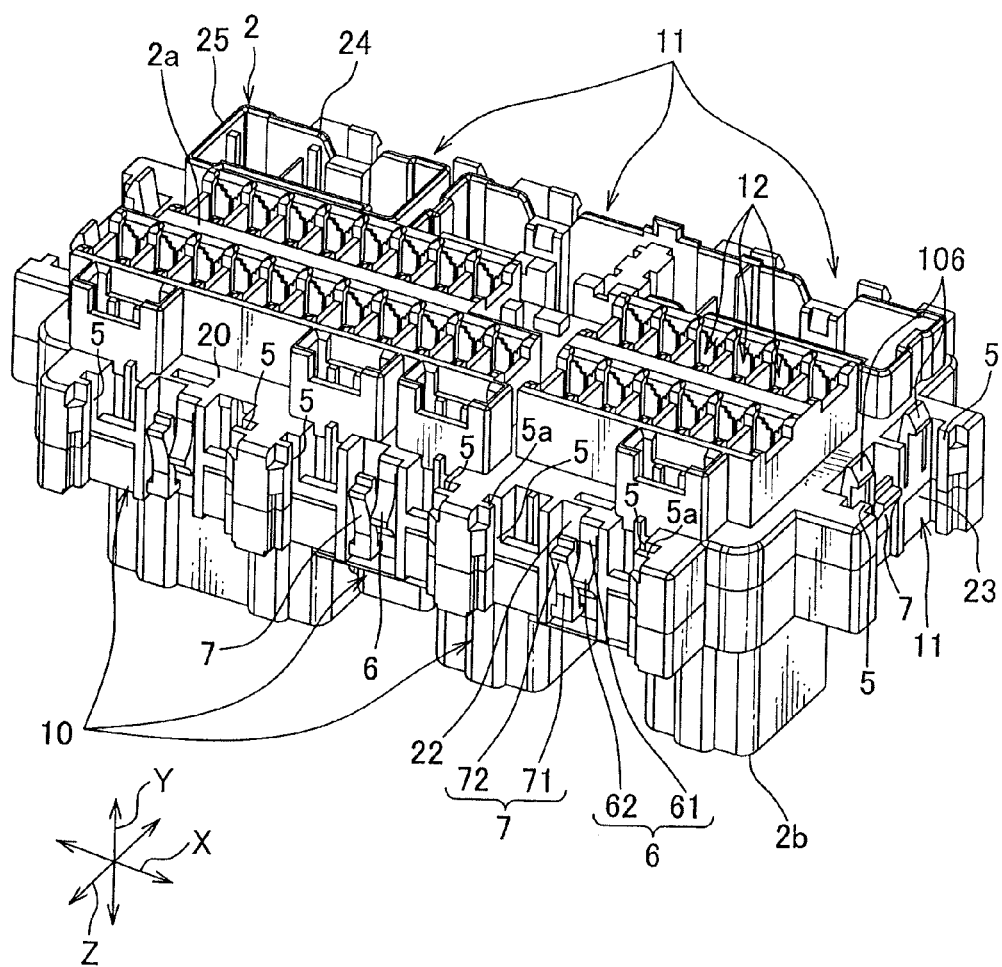
FIG. 3 is a perspective view of a case as the article shown in FIG. 1.
Figure 4:
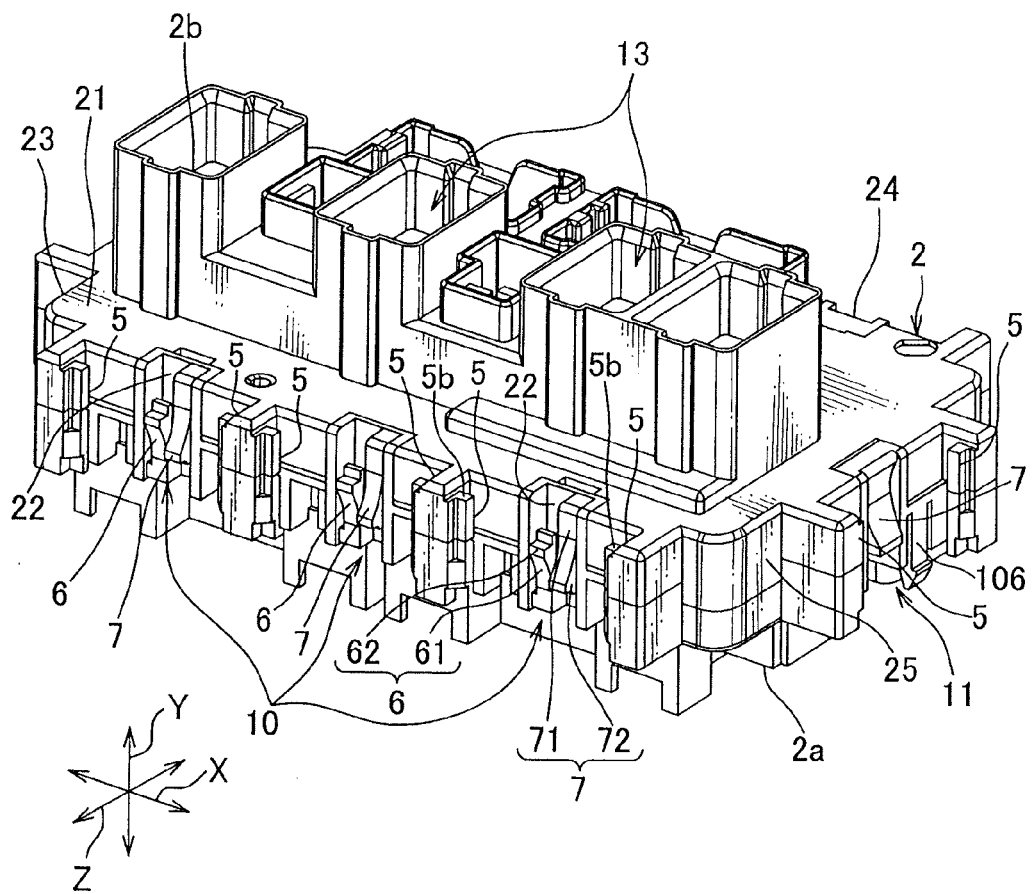
FIG. 4 is a perspective view of a case as the article shown in FIG. 2.
Figure 5:
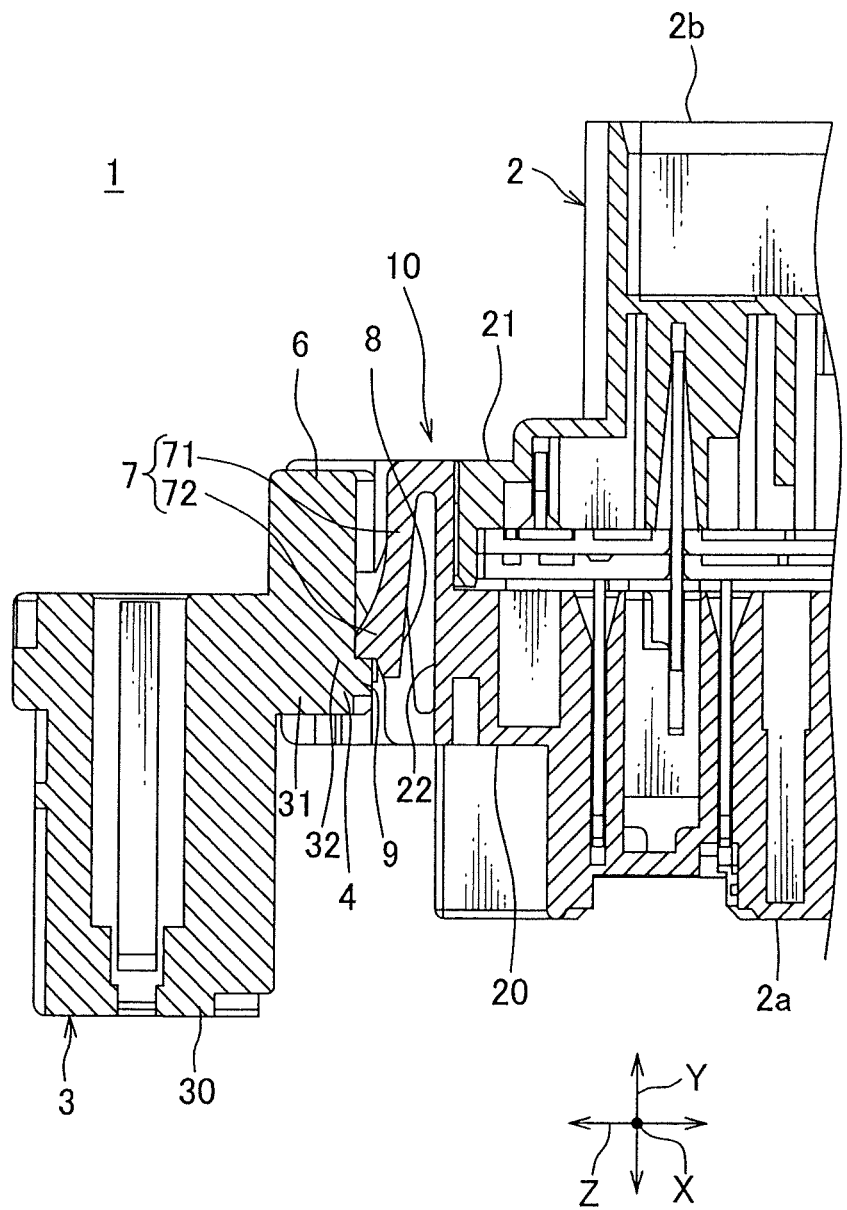
FIG. 5 is a cross-sectional view taken along the line A-A' in FIG. 2.
Figure 6:
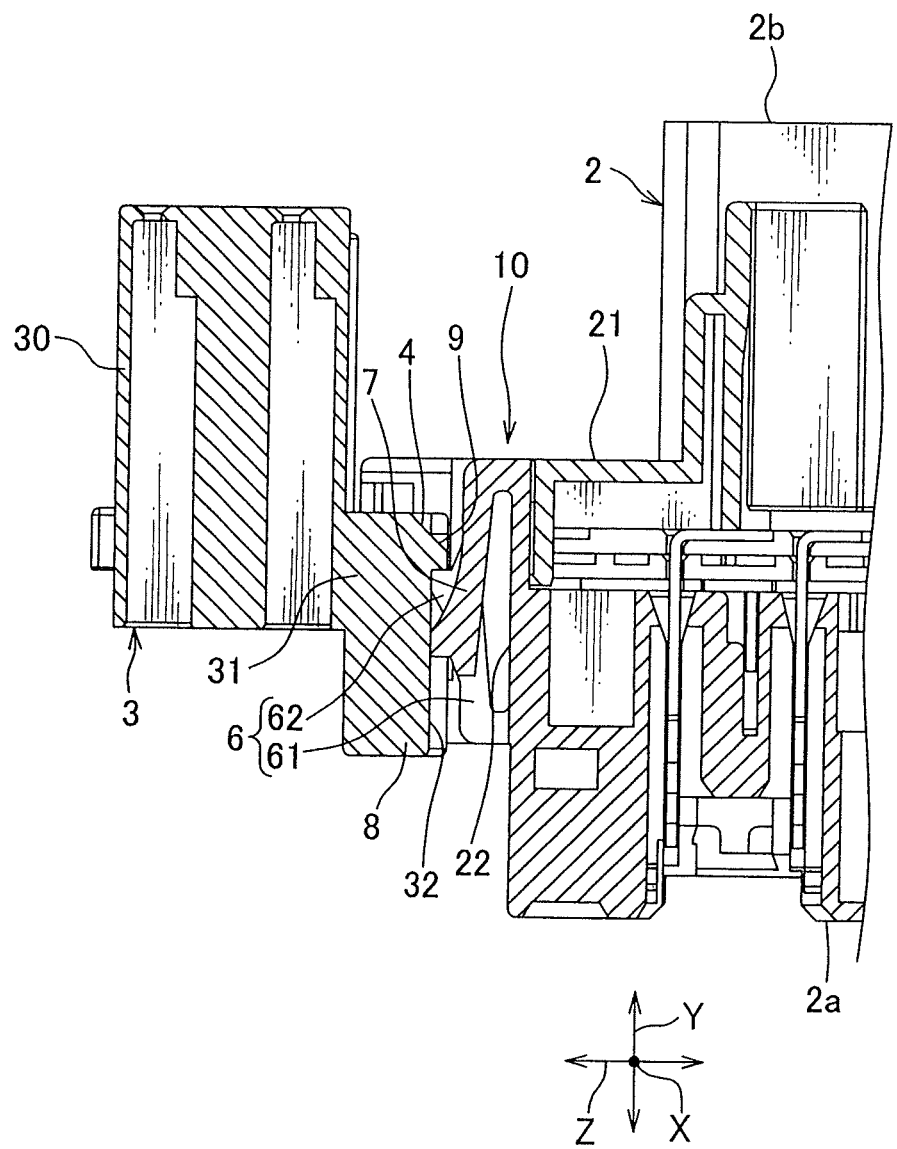
FIG. 6 is a cross-sectional view taken along the line B-B' in FIG. 2.

As shown in FIGS. 1 and 2, the above "attachment structure 1 of the article and the component" is an attachment structure attaching a component 3 to a plastic case 2 as the article.

Figure 7:
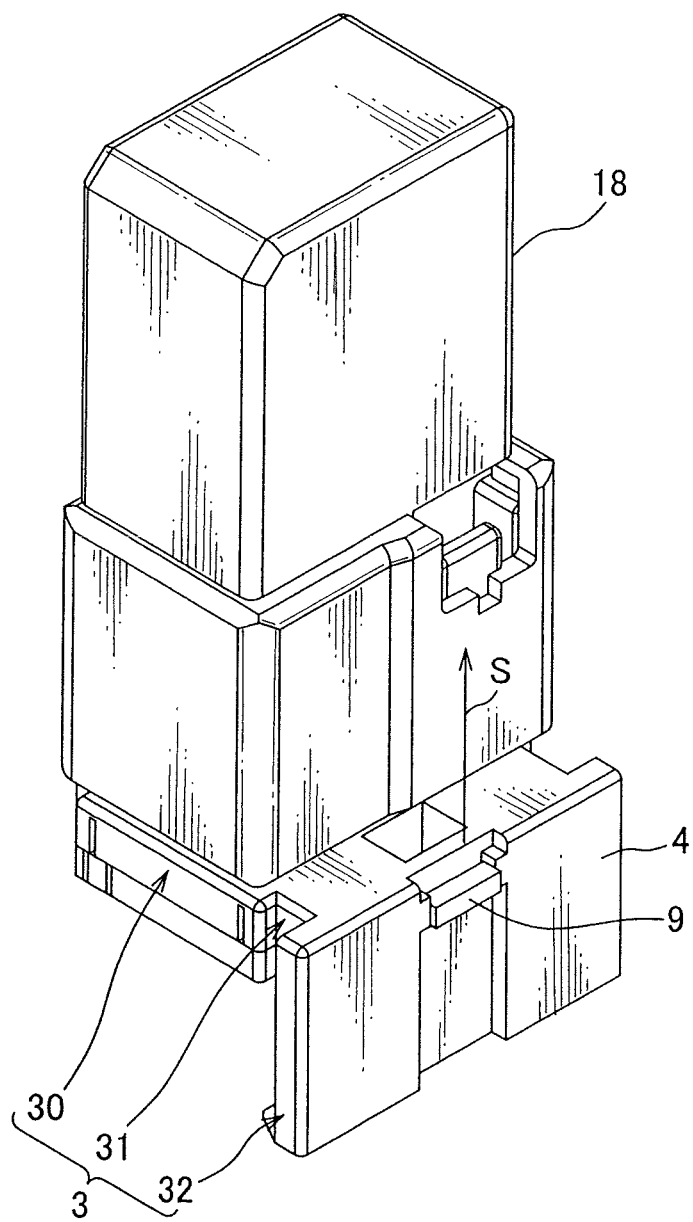
FIG. 7 is a perspective view showing a state that another component is attached to the component shown in FIG. 1.
Figure 8:
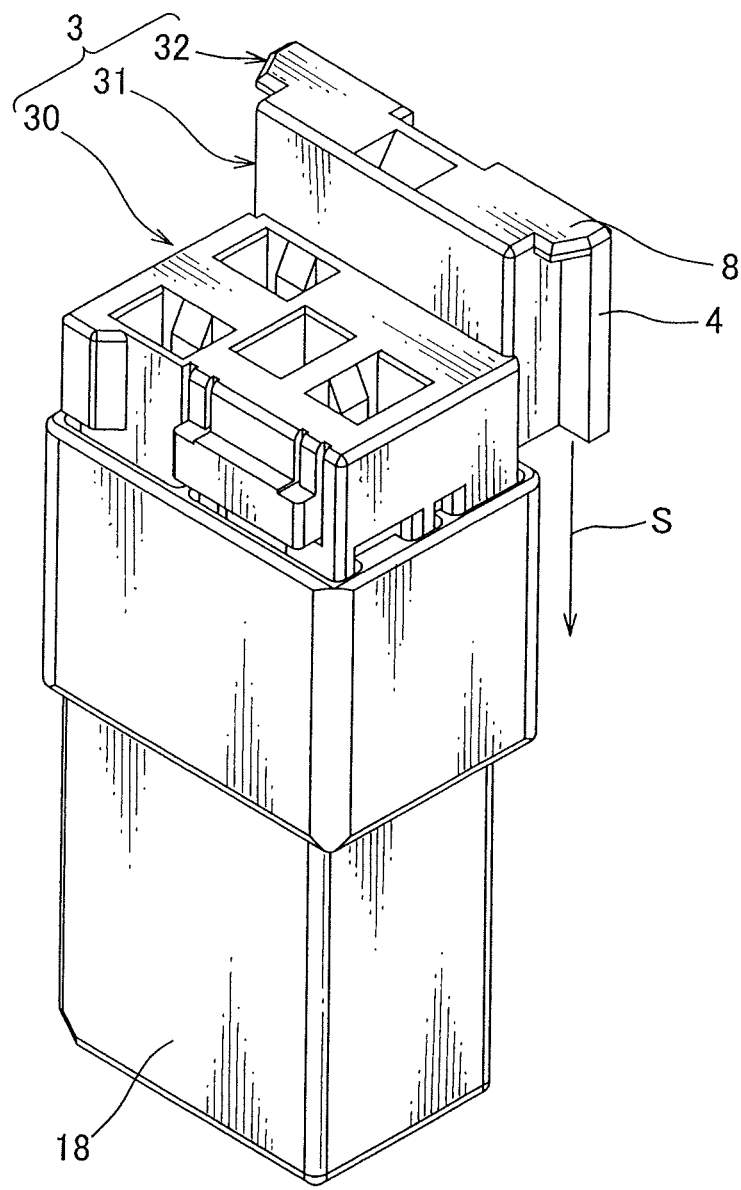
FIG. 8 is a perspective view showing the other component and the component shown in FIG. 7 from an upside down direction.

As shown in FIGS. 7 and 8, the above component 3 is a connector electrically connected with a relay 18. A drawing of an electric wire connected with the connector is omitted. The component 3 includes a joint 30 fitting in the relay 18, a component side attaching portion 32 which is attached to case side attaching portions 10 and 11 (discussed below) of the case 2, and a connection 31 connecting the joint 30 with the component side attaching portion 32.

The component side attaching portion 32 includes a slide portion 4 formed in a plate shape, a stopper 8 arranged in an end of the slide portion 4, and a projection 9 formed in a rectangular shape. The projection 9 projects from a surface which is placed away from the joint 30 of the slide portion 4.

The slide portion 4 is inserted between a pair of guide portions 5 (described below), and slidably positioned between the pair of guide portions 5. Furthermore, the arrow S in FIGS. 7 and 8 indicates a sliding direction when the slide portion 4 is inserted between the guide portions 5.

The stopper 8 is arranged in a rear end of the sliding direction of the slide portion 4, and is formed with a size in which is not able to insert the stopper 8 between the guide portions. As shown in FIGS. 1 and 2, the stopper 8 abuts on end surfaces 5a of the guide portions 5 at a one end 2a of the case 2 so that the component 3 is prevented from moving toward another end 2b of the case 2. Furthermore, the stopper 8 abuts on end surfaces 5b of the guide portions 5 at the other end 2b of the case 2 so that the component 3 is prevented from moving toward the one end 2a of the case 2.

The above case 2 is formed in a rectangular shape having an upper wall 20, a lower wall 21, and side walls 22, 23, 24, and 25. The arrow Y in FIGS. 1 to 6 indicates a height direction of the case 2, the arrow X indicates a longitudinal direction of the case 2, and the arrow Z indicates a width direction of the case 2. In the first embodiment of the present invention, "one end 2a of the case 2 (corresponding to the article)" means an end of the upper wall 20 of the arrow Y direction in the case 2, and "the other end 2b of the case 2 (corresponding to the article)" means an end of the lower wall 21 of the arrow Y direction in the case 2.

As shown in FIGS. 1 and 2, a fuse attaching portion 12 is arranged in the upper wall 20, and a connector fitting portion 13 is arranged in the lower wall 21. In the side wall 22, a plurality of case side attaching portions 10 are arranged along the arrow X direction, and is able to selectively attach the component 3. In the side wall 24, a plurality of case side attaching portions 11 are arranged along the arrow X direction, and is able to selectively attach the component 3. In the side walls 23 and 25, case side attaching portions 11 are arranged, respectively, and are able to selectively attach the component 3.

As shown in FIGS. 3 to 6, the case side attaching portion 10 includes a pair of guide portions 5, a first locking arm 6 and a second locking arm 7. The guide portions 5 extend from the one end 2a of the case 2 toward the other end 2b thereof parallel to each other, and the slide portion 4 is slidably positioned between the guide portions 5. The first locking arm 6 and the second locking arm 7 are engaged with the projection 9 of the component 3 positioning the slide portion between the guide portions 5 so that the component 3 is prevented from coming off the case 2 as the article.

As show in FIGS. 1 to 4, the above case side attaching portion 11 includes the pair of the guide portions 5, a pair of first locking arms 106, and the second locking arm 7. The guide portionss 5 extend from the one end 2a of the case 2 toward the other end 2b thereof parallel to each other, and the slide portion 4 is slidably positioned between the guide portions 5. Each the first locking arm 106 is engaged with the stopper 8 of the component 3 in which the slide portion 4 is positioned between the guide portions 5 so that the component 3 is prevented from coming off the case 2. The second locking arm 7 is engaged with the projection 9 of the component 3 in which the slide portion 4 is positioned between the guide portions 5 so that the component 3 is prevented from coming off the case 2.

The pair of guide portions 5 are arranged in outer surfaces of the side walls 22, 23, 24 and 25. An outer shape of the guide portion 5 is formed in a rectangular shape, and the guide portion 5 has a gap opening and facing each other. The gap opens in both end surfaces 5a and 5b of the arrow Y direction of the guide portion 5. Furthermore, both end portions of the slide portion 4 mentioned above are positioned in each gap of the guide portions 5. In "the attachment structure 1 of the article and the component", it is possible to insert the slide portion 4 between the guide portions 5 from both the one end 2a of the case 2 and the other end 2b thereof.

The first locking arm 6 and the second locking arm 7 in the case side attaching portion 10 are arranged in an outer surface of the side wall 22, the outer surface being positioned between the guide portions 5. Furthermore, the first locking arm 6 and the second locking arm 7 are located next to each other in a direction in which the pair of the guide portions 5 are opposed to each other.

Also, the first locking arm 106 and the second locking arm 7 in the case side attaching portion 11 are arranged in an outer surface of the side walls 23, 24 and 5, respectively, the outer surface being positioned between the guide portions 5. Furthermore, the pair of the first locking arms 106 are arranged in both sides of the second locking arm 7.

The above first locking arm 6 includes a first arm portion 61 and a first locking portion 62. The first arm portion 61 extends from the outer surface of the side wall 22 toward the other end 2b of the case 2, and is formed in a cantilever-plate shape. The first locking portion 62 projects from a free end of the first arm portion 61 toward a direction away from the side wall 22. When the slide portion 4 is inserted between the pair of the guide portions 5 from the one end 2a of the case 2, and slid toward the other end 2b of the case 2, the first locking arm 6 is pressed by the projection 9 and elastically deformed in the side wall 22. And then, the projection 9 passes beyond the first locking portion 62, and the first locking arm 6 returns to an original shape. As a result, the first locking arm 6 is overlapped on a surface of the one end 2a of the projection 9. As previously explained, since the first locking arm 6 is engaged with the projection 9, the component 3 is prevented from moving toward the one end 2a of the case 2.

Figure 13:
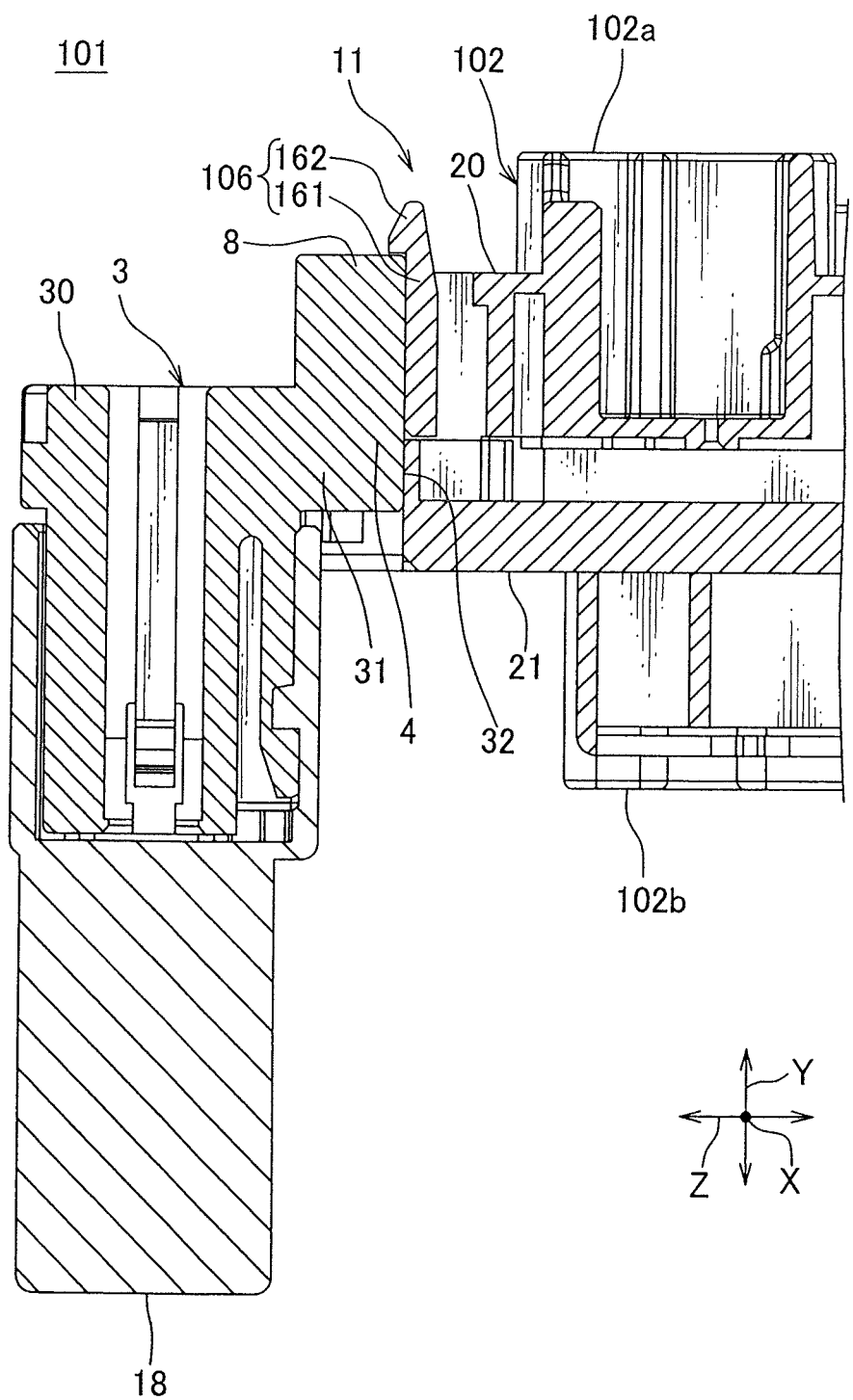
FIG. 13 is a cross-sectional view taken along the line C-C in FIG. 9.
Figure 14:
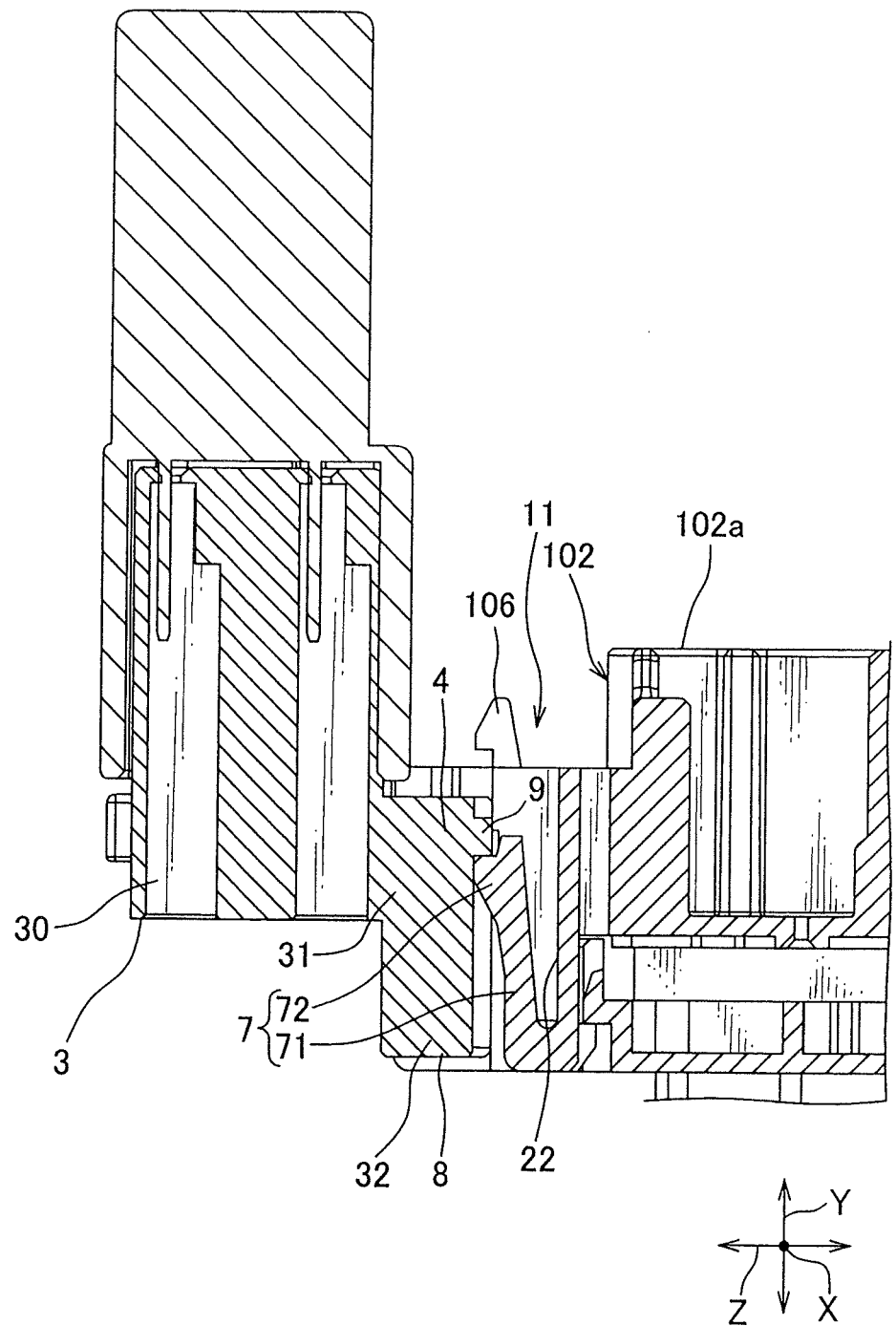
FIG. 14 is a cross-sectional view taken along the line D-D in FIG. 9.

The first locking arm 106 includes a third arm portion 161 and a third locking portion 162. The third arm portion 161 extends from the outer surface of the side walls 23, 24 and 25 toward the one end 2a, and is formed in a cantilever-plate shape. The third locking portion 162 projects from a free end of the third arm portion 161 toward a direction away from the side walls 23, 24 and 25. When the slide portion 4 is inserted between the pair of the guide portions 5 from the one end 2a of the case 2, and slid toward the other end 2b of the case, the first locking arm 106 is pressed by the slide portion 4 and the stopper 8, and elastically deformed in the side walls 23, 24 and 25. Thereafter, the stopper 8 passes beyond the third locking portion 162, and the first locking arm 106 returns to an original shape. As a result, the first locking arm 106 is overlapped on a surface of the one end 2a of the stopper 8. As mentioned above, since the pair of the first locking arms 106 are engaged with the stopper 8, the component 3 is prevented from moving toward the one end 2a of the case 2 (see FIGS. 9 and 13).

The second locking arm 7 includes a second arm portion 71 and a second locking portion 72. The second arm portion 71 extends from the outer surface of the side walls 22, 23, 24 and 25 to the one end 2a of the case 2, and is formed in a cantilever-plate shape. The second locking portion 72 projects from a free end of the second arm portion 71 toward a direction away from the side wall 22. When the slide portion 4 is inserted between the pair of the guide portions 5 from the other end 2b of the case 2 in a direction opposite to a direction when the slide portion 4 is inserted between the guide portions from the one end 2a of the case 2, and slid toward the one end 2a of the case 2, the second locking arm 7 is pressed by the projection 9 and elastically deformed in the side wall 22. And then, the projection passes beyond the second locking portion 72, and the second locking arm 7 returns to an original shape. Thereafter, the second locking arm 7 is overlapped on a surface of the other end 2b of the projection 9. As previously mentioned, since the second locking arm 7 is engaged with the projection 9, the component 3 is prevented from moving toward the other end 2b of the case 2.

Furthermore, when the first locking arms 6 and 10 are engaged with the component 3, the stopper 8 abuts on an end surface 5a of the guide portions 5 so that the component 3 is prevented from moving toward the other end 2b of the case 2. When the second locking arm 7 is engaged with the component 3, the stopper 8 abuts on an end surface 5b of the guide portions so that the component 3 is prevented from moving toward the one end 2a of the case 2.

Thus, according to "the attachment structure 1 of the article and the component" of the first embodiment of the present invention, the component 3 can be attached to the case side attaching portions 10 and 11 of the case 2 in both directions, that is, both one direction and a direction opposite to the one direction. Furthermore, the component 3 can be attached to the case side attaching portions 10 and 11 at a desired position. In addition, in the electric junction box having "the attachment structure 1 of the article and the component", space can be efficiently used in the vehicle, and optimum layout can be designed.

Second Embodiment

Next, "an attachment structure 101 of an article and a component" according to a second embodiment of the present invention will be explained with reference to FIGS. 9 to 14. In FIGS. 9 to 14, components already described with reference to the first embodiment are denoted by the same reference numerals, and thus detailed description thereof will be hereinafter omitted. Furthermore, "the attachment structure 101 of the article and the component" of the second embodiment of the present invention constructs "an electric junction box" mounted on a vehicle in the same manner as the first embodiment.

Figure 9:
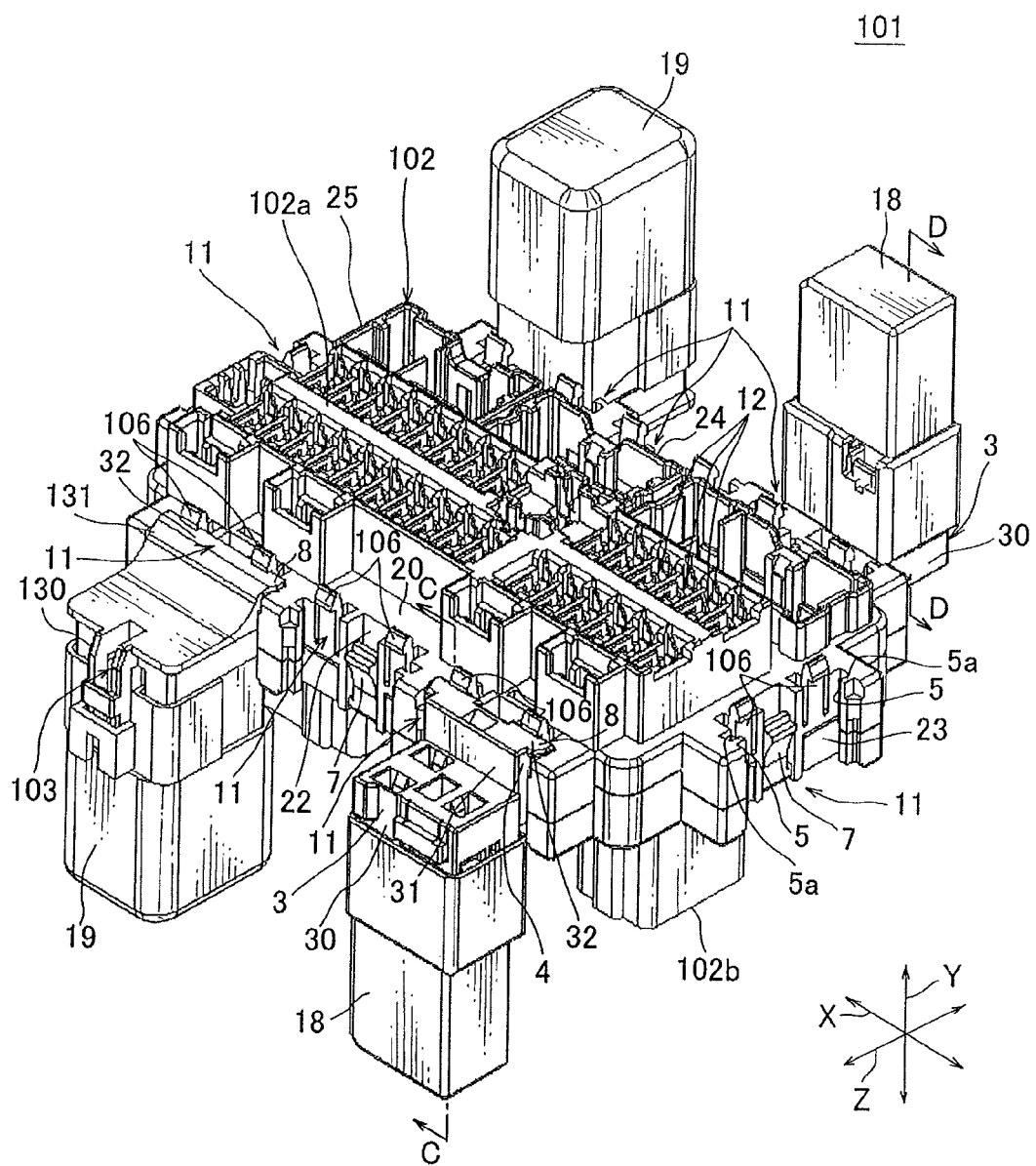
FIG. 9 is a perspective view showing an attachment structure of an article and a component according to a second embodiment of the present invention.
Figure 10:
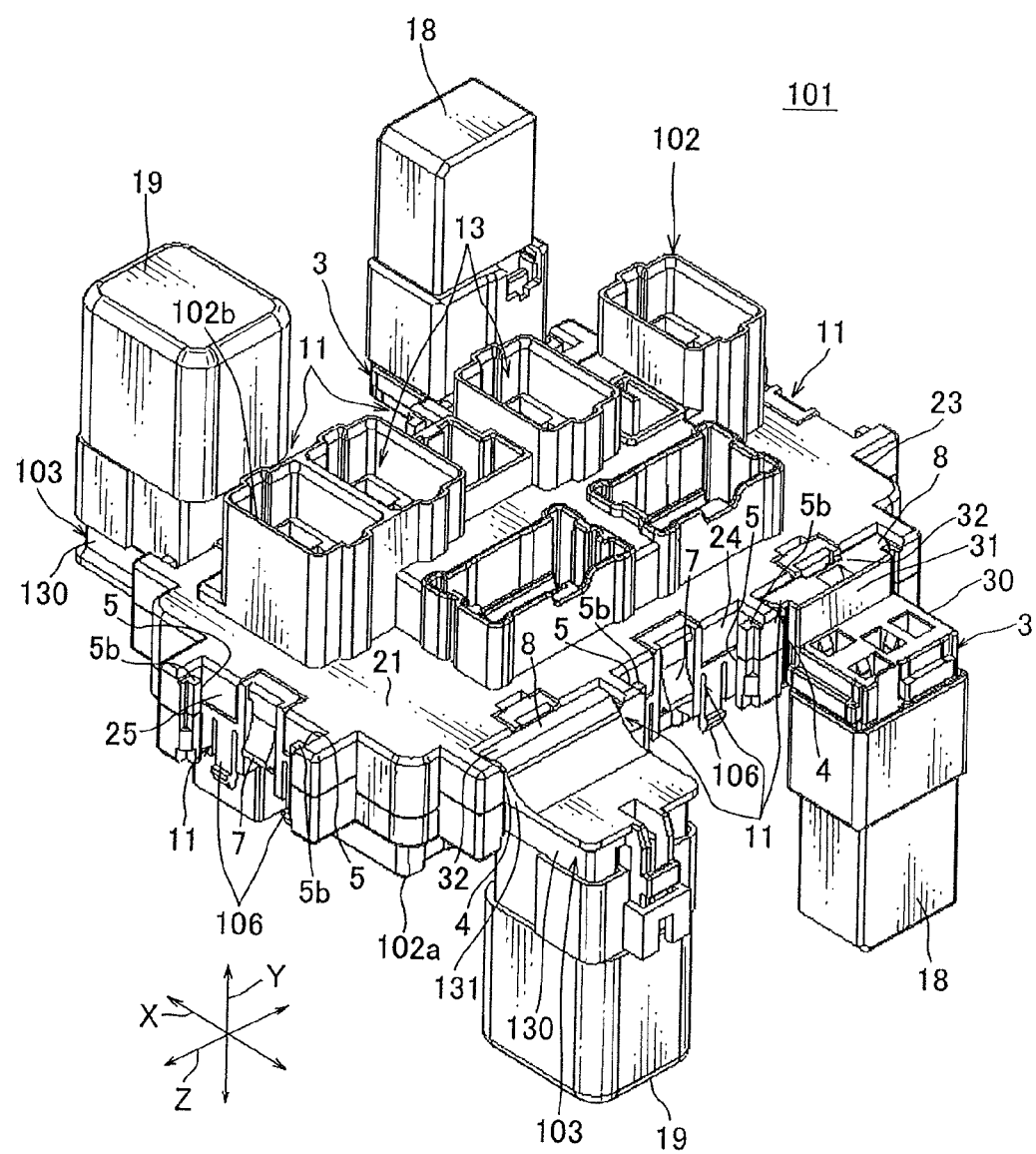
FIG. 10 is a perspective view showing the attachment structure of the article shown in FIG. 9 and the component shown in FIG. 9 from an upside down direction.
Figure 11:
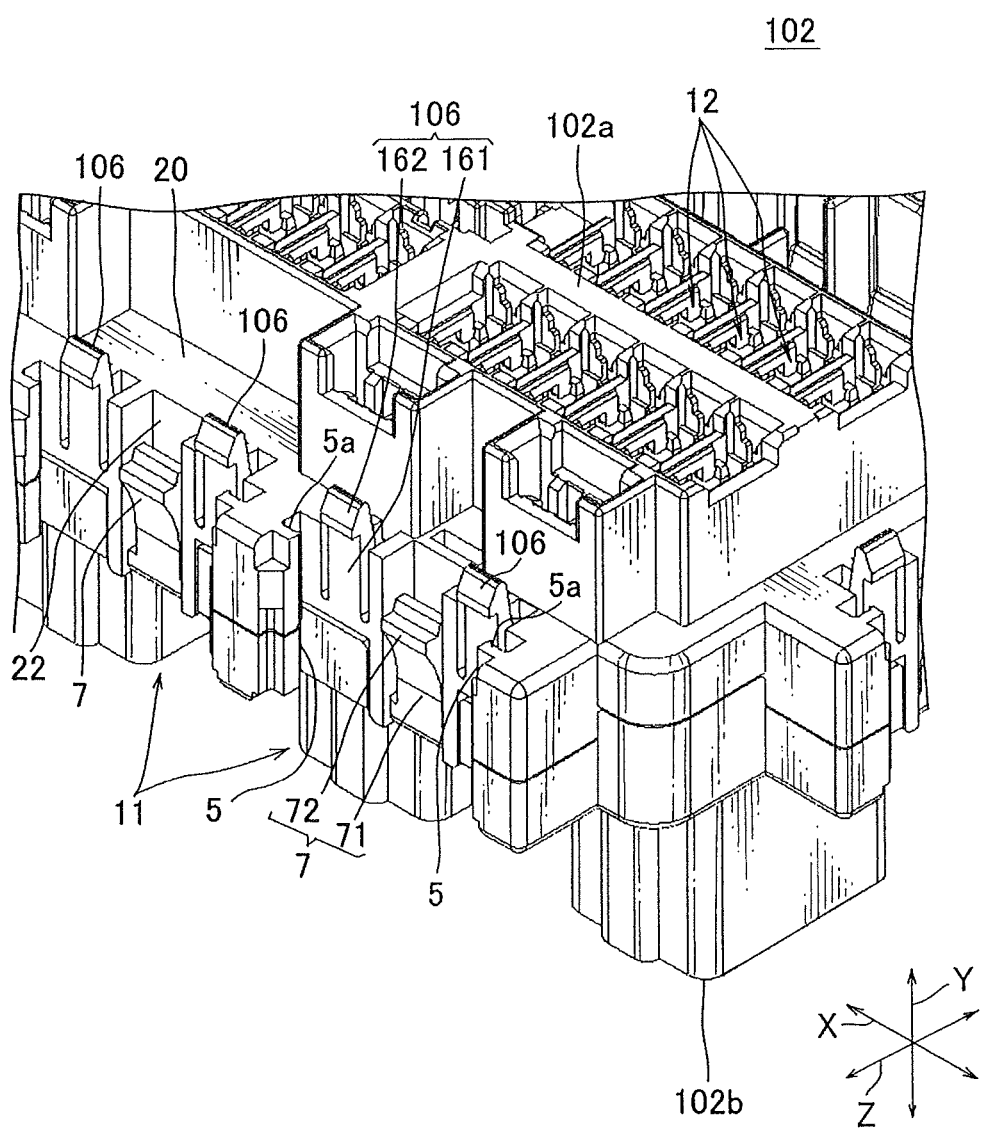
FIG. 11 is a perspective view of the case as the article shown in FIG. 9.
Figure 12:
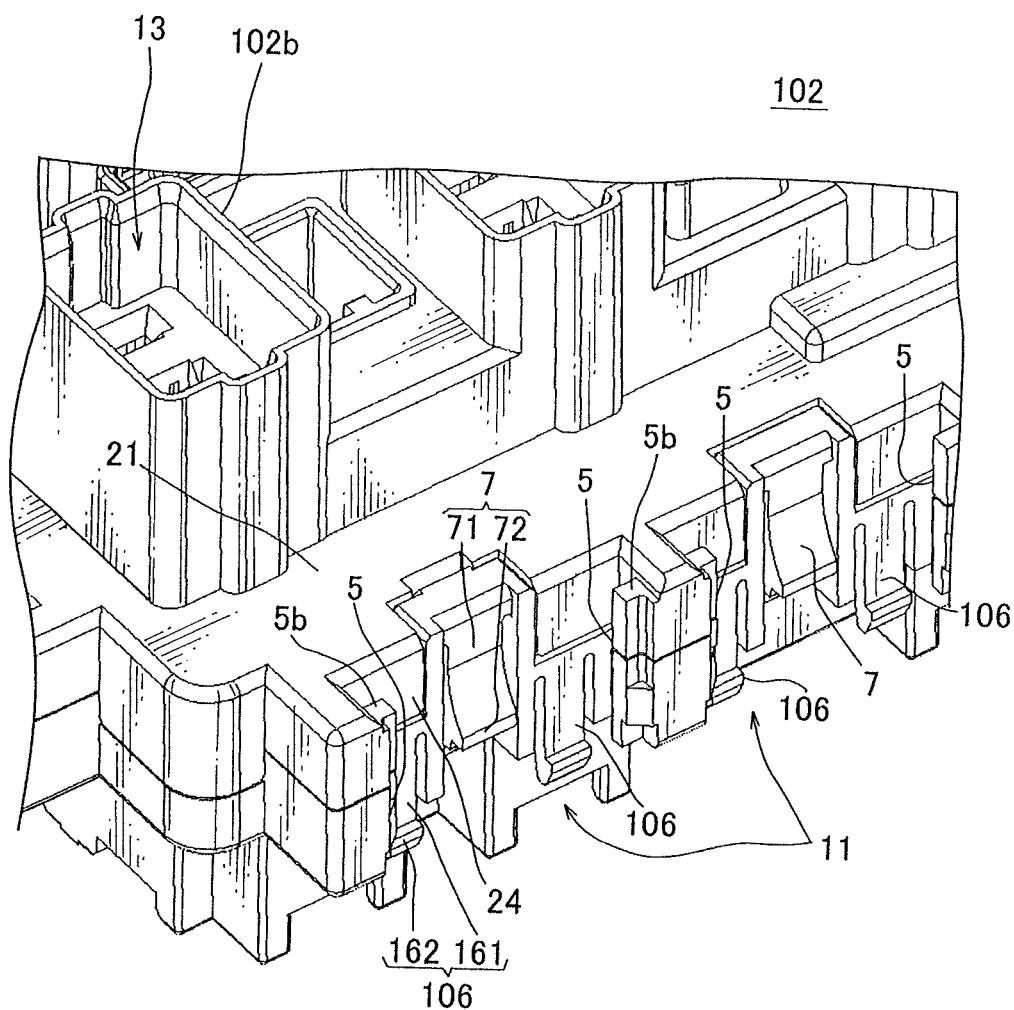
FIG. 12 is a perspective view of the case as the article shown in FIG. 10.

As shown in FIGS. 9 and 10, the above "the attachment structure 101 of the article and the component" is an attachment structure attaching components 3 and 103 to a plastic case 102 as the article.

The component 103 is a connector connected to a relay 19 as shown in FIGS. 9 and 10. A figure of an electric wire connected to the connector is omitted. The component 103 includes a joint 130 fitting in the relay 19, a component side attaching portion 32 installed in the case side attaching portion 11 of the case 102, and a connection 131 connecting the joint 130 with the component side attaching portion 32. The component side attaching portion 32 of the component 103 is constructed in the same manner as the component side attaching portion 32 of the component 3.

The above case 102 is formed in a rectangular shape having the upper wall 20, the lower wall 21, and the side walls 22, 23, 24 and 25. The arrow Y in FIGS. 9 to 14 indicates a height direction of the case 102, the arrow X indicates a longitudinal direction of the case 102, and the arrow Z indicates a width direction of the case 102. In the second embodiment of the present invention, "one end 102a of the case 102 (corresponding to the article)" means an end of the upper wall 20 of the arrow Y direction in the case 102, and "the other end 102b of the case 102" means an end of the lower wall 21 of the arrow Y direction in the case 102.

As shown in FIGS. 9 to 14, the case side attaching portions 11 which are able to selectively attach the components 3 and 103 are arranged in the side walls 23 and 25, respectively. Furthermore, in the side walls 22 and 24, a plurality of the case side attaching portions 11 which are able to selectively attach the components 3 and 103 are arranged along the arrow X direction. In "the attachment structure 101 of the article and the component", it is possible to insert the slide portion 4 between the pair of the guide portions 5 from both the one end 102a of the case 102 and the other end 102b thereof.

Thus, according to "the attachment structure 101 of the article and the component" of the second embodiment of the present invention, the components 3 and 103 can be attached to the case side attaching portion 11 of the case 102 at both one position and a position opposite to the one position. Furthermore, the components 3 and 103 can be attached to the case side attaching portion 11 at a desired position. In an electric junction box having "the attachment structure 101 of the article and the component", space in the vehicle can be efficiently used, and optimum layout can be provided. Furthermore, in the second embodiment of the present invention, it is possible to attach various types of the components 3 and 103 to the case side attaching portion 11 by arranging the component side attaching portion 32 formed in the same shape in the various types of the components 3 and 103.

Third Embodiment

Next, "an attachment structure 201 of an article and a component" according to a third embodiment of the present invention will be explained with reference to FIGS. 15 to 19. In FIGS. 15 to 19, components already described with reference to the first embodiment are denoted by the same reference numerals, and thus detailed description thereof will be hereinafter omitted. Furthermore, "the attachment structure 201 of the article and the component" of the third embodiment of the present invention constructs "an electric junction box" mounted on a vehicle in the same manner as the first and second embodiments.

Figure 15:
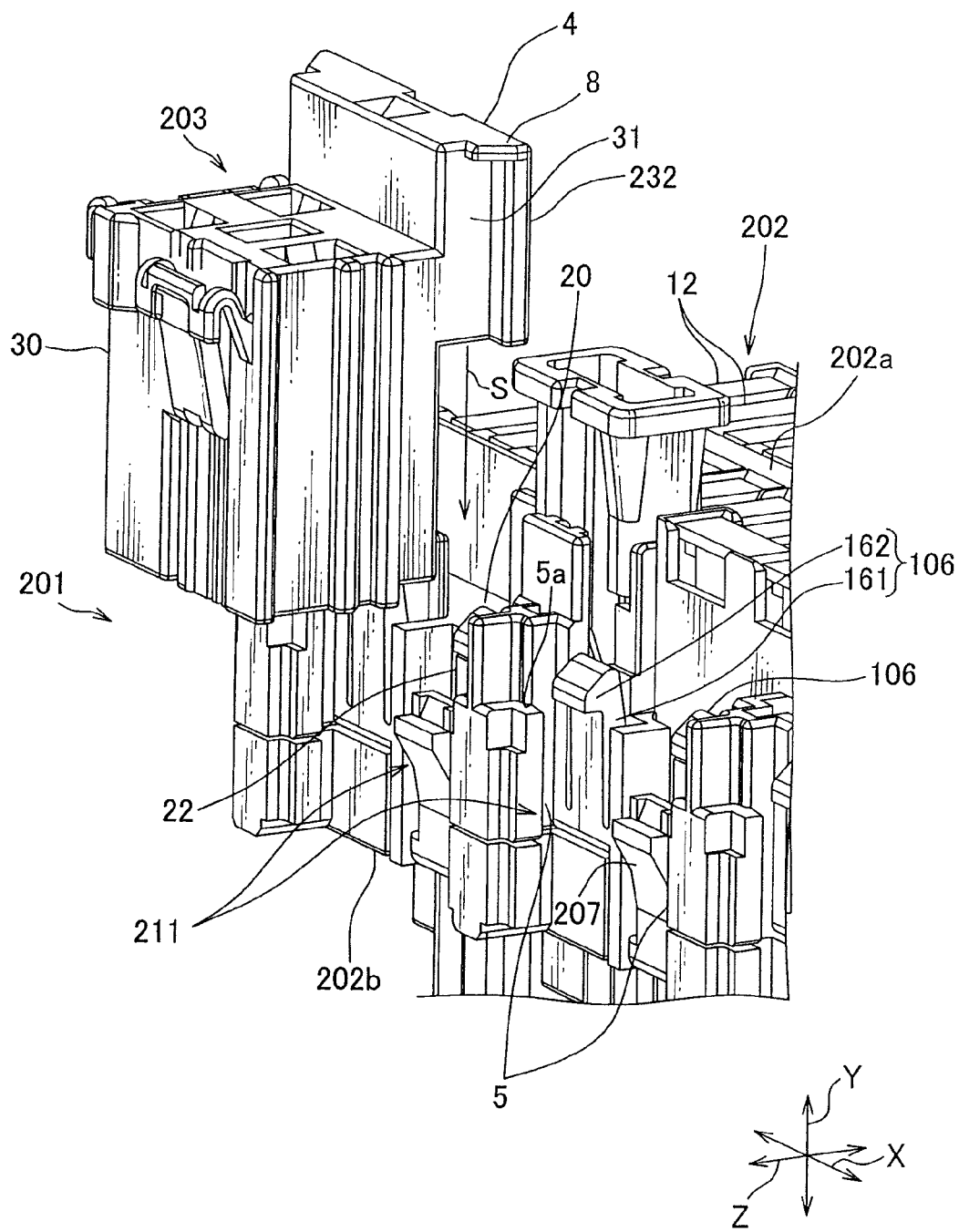
FIG. 15 is a perspective view showing an attachment structure of an article and a component according to a third embodiment of the present invention.
Figure 16:
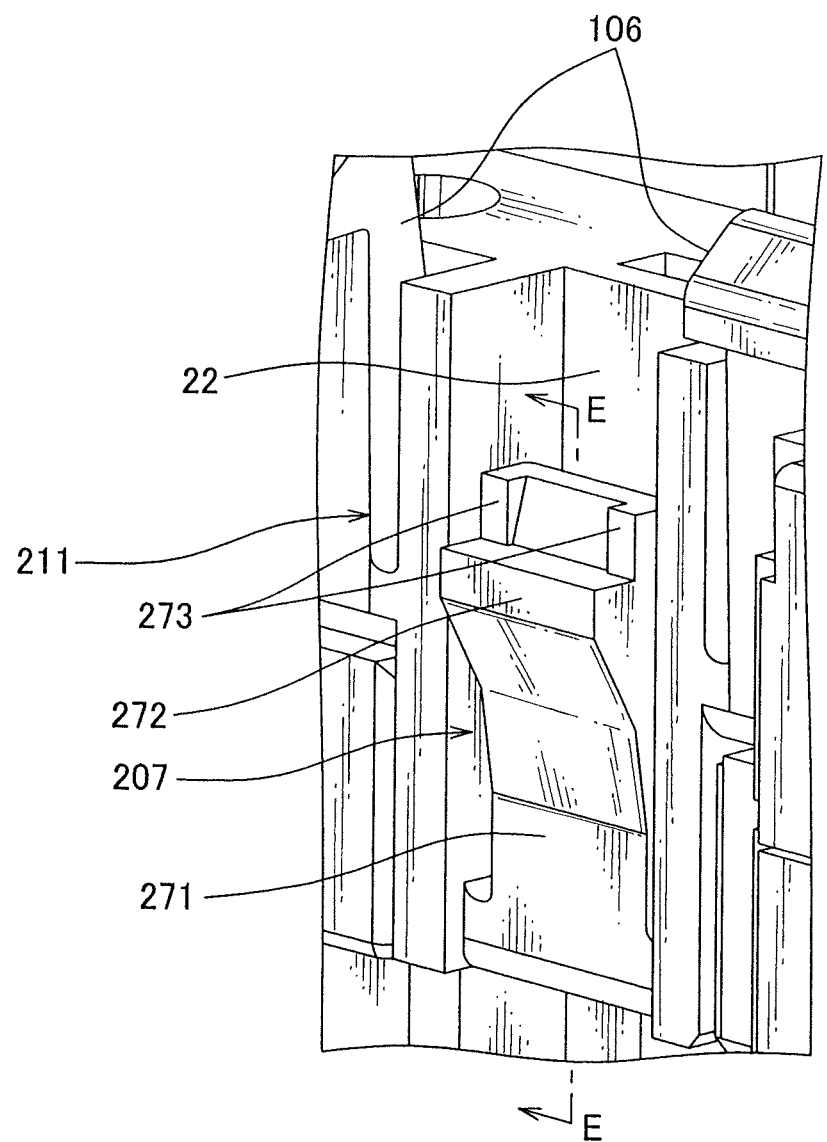
FIG. 16 is an enlarged view of a second locking arm shown in FIG. 15.

As shown in FIG. 15, the above "attachment structure 201 of the article and the component" is an attachment structure attaching a component 203 to a plastic case 202 as the article.

Figure 17:
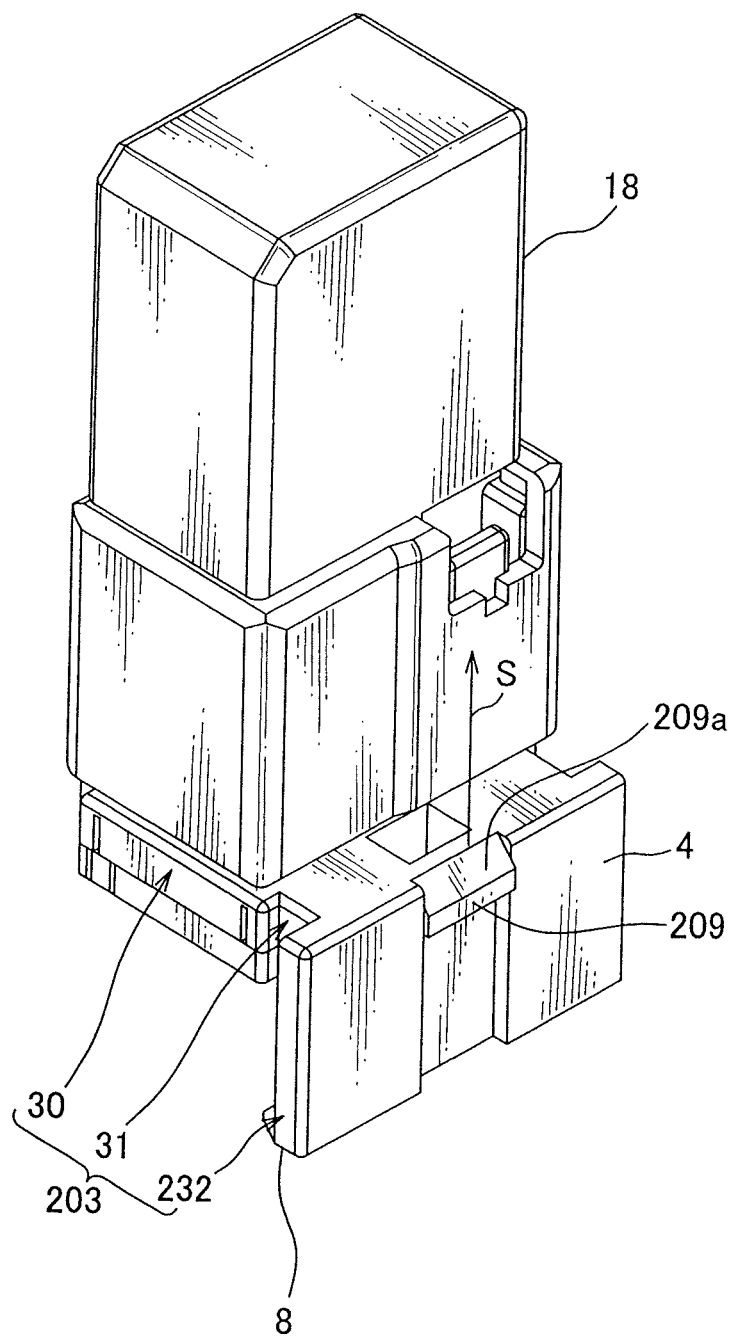
FIG. 17 is a perspective view showing a state that another component is attached to the component shown in FIG. 15.

The component 203 is a connector connected to the relay 18 as shown in FIG. 17. A figure of an electric wire connected to the connector is omitted. The component 203 includes the joint 30 fitting in the relay 18, a component side attaching portion 232 installed in a case side attaching portion 211, and the connection 31 connecting the joint 30 with the component side attaching portion 232.

The component side attaching portion 232 includes the slide portion 4 formed in a plate shape, the stopper 8 arranged in the rear end of the sliding direction of the slide portion 4, and a projection 209 projecting from a surface away from the joint 30 of the slide portion 4 and formed in a rectangular shape.

The projection 209 is arranged in a front end of the sliding direction of the slide portion 4. Furthermore, a taper 209a is formed in an end away from the stopper 8 of the projection 209.

In the above case 202, a pair of triangular ribs 273 are arranged in a second arm 207 discussed below. Besides the above construction, the case 202 is constructed in the same manner as the case 102 explained in the second embodiment. As shown in FIG. 15, a plurality of case side attaching portions 211 are arranged in the side wall 22 of the case 202, and is able to selectively attach the component 203.

The case side attaching portion 211 includes a pair of guide portions 5, a pair of first locking arms 106, and a second locking arm 207. The guide portions 5 extend from the one end 202a of the case 202 toward the other end 202b thereof parallel to each other, and the slide portion 4 of the component 203 is slidably positioned between the guide portions 5. The first locking aim 106 is engaged with the stopper 8 of the component 203 so that the component 203 is prevented from coming off the case 202 when the slide portion 4 is inserted between the guide portions 5 from the one end 202a of the case 202 and slid to the other end 202b of the case 202. The second locking arm 207 is engaged with the projection 209 of the component 203 so that the component 203 is prevented from coming off the case 202 when the slide portion is inserted between the guide portions 5 from the other end 202b of the case 202 and slid to the one end 202a of the case 202 in a direction opposite to a direction when the slide portion 4 is inserted between the guide portions 5 from the one end 202a of the case 202. Furthermore, the pair of the first locking arms 106 are positioned at both sides of the second locking arm 207.

Figure 18:
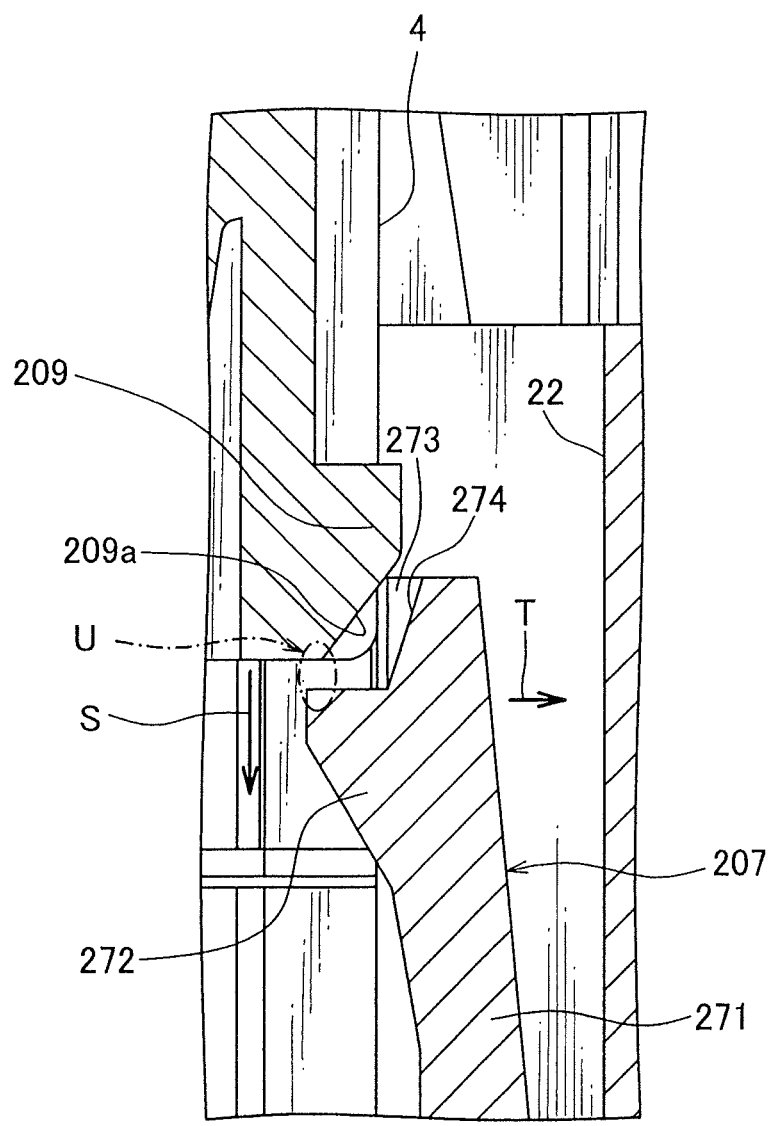
FIG. 18 is a cross-sectional view taken along the line E-E in the second arm shown in FIG. 16, and showing a projection coming in contact with the second locking arm.

The second locking arm 207 includes a second arm portion 271, a second locking portion 272, and a pair of triangular ribs 273. The second arm portion 271 extends from the outer surface of the side wall 22 to the one end 202a of the case 202, and is formed in a cantilever-plate shape. The second locking portion 272 projects from a free end of the second arm portion 271 toward a direction away from the side wall 22. As shown in FIG. 18, a taper 274 is formed in a portion opposite to the side wall 22 of the free end of the second arm portion 271.

Thereby, a width of a free end of the second arm portion 271 is thinner than a width of a fixed end of the second arm portion 271.

The pair of the triangular ribs 273 project from the free end of the second arm portion 271 beyond the second locking arm 272, namely, from the taper 274 in the same direction as the second locking portion 272, and are arranged in both ends of a width direction of the second arm portion 271. Furthermore, a surface of the second locking portion 272 in the triangular rib 273 is positioned parallel to a surface of the side wall 22 in the free end of the second arm portion 271. Also, the triangular rib 273 corresponds to "protrusion" in claims.

In such the case side attaching portion 211, when the slide portion 4 is inserted between the pair of the guide portions 5 from the other end 202b of the case 2, the second locking portion 272 is overlapped on the projection 209, and the component 203 is engaged with the second locking arm 207. In addition, when the slide portion 4 is inserted between the pair of the guide portions 5 from the one end 202a of the case 2, as shown in FIG. 18, the taper 209a of the projection 209 comes in contact with the pair of the triangular ribs 273, and the second locking arm 207 is displaced toward the side wall 22, namely, the arrow T direction.

Thus, according to "the attachment structure 201 of the article and the component" of third embodiment of the present invention, the second locking arm 207 is displaced toward the side wall 22 when the slide portion 4 is inserted between the pair of the guide portions 5 from the one end 202a of the case 202. Therefore, a flat surface of the projection 209 can be prevented from coming in contact with a flat surface of the second locking portion 272, and from catching on the flat surface of the second locking portion 272. As a result, the slide portion 4 can be smoothly inserted between the guide portions 5.

Figure 19:
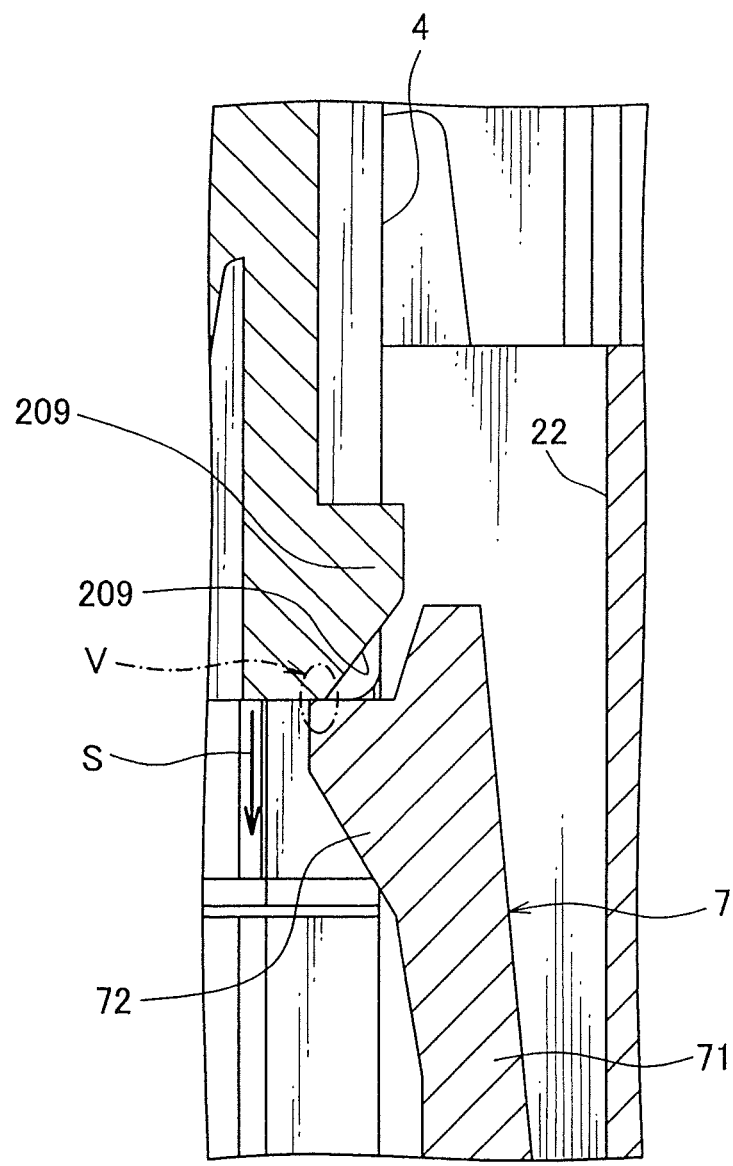
FIG. 19 is a reference view illustrating function effect of the second locking arm and the projection shown in FIG. 18.

Also, as shown in FIG. 19 (reference figure), if the pair of the triangular ribs 273 is not arranged in the second locking arm 7, the flat surface of the projection 209 comes in contact with the flat surface of the second locking portion 72 and is caught thereon when the slide portion 4 is inserted between the pair of the guide portions 5. For this reason, great force is required. Furthermore, in order to avoid hitting the projection 209 on the second locking portion 72, if a portion away from the second arm portion 71 of the second locking portion 72 is cut, a connection of the projection 209 and the second locking portion 72 is reduced when the slide portion 4 is inserted between the guide portions in the opposite direction. In addition, the connector 203 as the component is standardized among vehicle manufactures. For this reason, it is difficult to improve the connector so as to prevent the projection 209 from catching on the second locking portion 72.

Thus, according to "the attachment structure 201 of the article and the component" of the third embodiment of the present invention, the component 203 being standard component can be used, and can be smoothly attached to the case side attaching portion 211 at two positions without cutting the second locking portion 272 and without reducing holding force of the component 203.

In the first, second and third embodiments, examples in which "the attachment structures 1, 101 and 201 of the article and the component" are used in the electric junction box are illustrated, but it is not limited thereto. "The attachment structures 1, 101 and 201 of the article and the component" can be used other than the electric junction box. That is, "the article" of the present invention is not only the cases 2, 102 and 202 described above but also a vehicle, a device body, a protector and the like are included.

It should be noted that the embodiment has only been illustrated as a typical three of the present invention, and the present invention is in no way limited to the illustrated embodiments. Hence, the present invention can be effectuated with various modifications made thereto within the scope of the present invention.

What is claimed is:

1. An attachment structure for attachment of a component to an article, comprising:
   (a) a pair of guide portions provided on the article, the guide portions extending parallel from one end of the article toward an other end thereof;
   (b) a slide portion provided in the component and adapted to be slidably positioned between the guide portions;
   (c) a first locking arm provided in the article and configured to be brought into locking engagement with the component in a state where the slide portion is inserted in a space between the pair of the guide portions from the one end of the article and slides toward the other end of the article, and thereby prevent the component from moving toward the one end of the article;
   (d) a second locking arm provided in the article and configured to be brought into locking engagement with the component in a state where the slide portion is inserted in the space between the pair of the guide portions from the other end of the article in a posture opposite to that in which the slide portion is inserted between the pair of the guide portions from the one end of the article, and thereby prevent the component from moving toward the other end of the article; and
   (e) a stopper provided at an end of the slide portion and sized and dimensioned to not enter the space between the pair of the guide portions, the stopper being configured to abut on an end surface of the pair of the guide portions at the one end of the article in a state where the first locking arm is in locking engagement with the component, and thereby prevent the component from moving toward the other end of the article, the stopper also being configured to abut on an end surface of the pair of the guide portions at the other end of the article, in a state where the second locking arm is in locking engagement with the component, and thereby prevent the component from moving toward the one end of the article.

2. The attachment structure attaching the component to the article according to claim 1, wherein the first locking arm and the second locking arm are arranged in a wall positioned between the pair of the guide portions located in a direction opposite to each other,
   wherein a projection projecting toward the wall is arranged in the slide portion,
   wherein the first locking arm includes a first arm portion extending from the wall toward the other end of the article and formed in a cantilever-plate shape, and a first locking portion projecting from a free end of the first arm portion and overlapped on the projection,
   wherein the second locking arm includes a second arm portion extending from the wall toward the one end of the article and formed in a cantilever-plate shape, and a second locking portion projecting from a free end of the second arm portion and overlapped on the projection.

3. The attachment structure attaching the component to the article according to claim 1, wherein the second locking arm includes a second arm portion extending from a wall positioned between the pair of the guide portions toward the one end of the article and formed in a cantilever-plate shape, a second locking portion projecting from a free end of the second arm portion, and a protrusion projecting from a free end of the second locking arm beyond the second locking portion in the same direction as the second locking portion,
   wherein a width of a free end of the second arm portion beyond the second locking portion is thinner than a width of a fixed end of the second arm portion,
wherein a projection projecting toward the wall and having a taper which is formed in an end of the projection is arranged in the slide portion,
   wherein when the slide portion is inserted between the pair of the guide portions from the other end of the article, the second locking portion is overlapped on the projection, and the component is engaged with the second locking arm,
wherein when the slide portion is inserted between the pair of the guide portions from the one end of the article, the taper of the projection comes in contact with the protrusion, and the second locking arm is displaced toward the wall.

4. An electric junction box including the attachment structure for attachment of the component to the article described in claim 1.

5. An electric junction box including the attachment structure for attachment of the component to the article described in claim 2.

6. An electric junction box including the attachment structure for attachment of the component to the article described in claim 3.

* * * * *